June 5, 1962 R. W. LEINS ET AL 3,037,369
APPARATUS FOR THE FLUID TREATMENT OF STRANDS
OF ELONGATED MATERIAL
Original Filed June 23, 1960 2 Sheets-Sheet 2

INVENTORS
RICHARD W. LEINS
WILLIAM R. OSBAN
BY
*Harold L. Kauffman*
ATTORNEY

United States Patent Office 3,037,369
Patented June 5, 1962

3,037,369
APPARATUS FOR THE FLUID TREATMENT OF STRANDS OF ELONGATED MATERIAL
Richard W. Leins, Pensacola, and William R. Osban, Gulf Breeze, Fla., assignors to American Cyanamid Company, New York, N.Y., a corporation of Maine
Original application June 23, 1960, Ser. No. 38,326. Divided and this application Sept. 26, 1961, Ser. No. 143,001
8 Claims. (Cl. 68—5)

This invention relates broadly to certain new and useful improvements in apparatus for the fluid treatment of strands of elongated material. More particularly it is concerned with a new and improved apparatus for treating natural and synthetic monofilaments and multifilaments with fluid media in liquid or vapor state during their travel from one point to another, and especially those which are normally subject to damage during removal from the treating zone or vessel but which can be rendered damage-resistant by quenching. Examples of such filamentary materials are those made from fiber-formable, thermoplastic homopolymers and copolymers of both the condensation- and addition-polymerization types.

The present invention relates particularly to certain new and useful improvements in apparatus for performing a continuous method of producing polyacrylonitrile filamentary material, specifically a tow or a continuous filamentary yarn comprised of a fiber-formable polymer of acrylonitrile. Such a polyacrylonitrile filamentary material may be comprised of as little as, for example, 35% by weight of a polymer of acrylonitrile. Advantageously the polyacrylonitrile filamentary material is comprised of a polymer of acrylonitrile containing a major proportion of (preferably at least 70%), by weight acrylonitrile combined in the polymer molecule. The acrylonitrile polymer may be a homopolymer or a copolymer of acrylonitrile, or it may be a blend in which the filamentary material is produced from a blend of two different polymers, the acrylonitrile content of which is at least 70% by weight of combined acrylonitrile. The invention also includes apparatus which is especially adapted for use in producing polyacrylonitrile filamentary material.

The terms "strand," "strands," "structure" and "structures" as used generically herein (including the claims in the case of "strand" and "strands") is intended to include within its meaning elongated materials in any form, including monofilaments and multifilaments in yarn, thread, fabric, rod, tape, ribbon, strand, rope, bundle, tow, or other form, and also elongated sheets, films and the like, and which are of continuous (i.e., indefinite) length.

It was known prior to the present invention that polymeric acrylonitrile strands or structures which do not fibrillate, or which fibrillate only to a negligible degree, can be produced by subjecting a filamentary material or other structure comprised of a polymer of acrylonitrile to a relatively high temperature and pressure in the presence of saturated or wet steam. The known prior art is disclosed in, for example, U.S. Patent No. 2,708,843, dated May 24, 1955, and in the art referred to therein. As is stated in the specification of this patent (column 1, line 44, through column 2, line 15):

"Various and sundry types of apparatus are presently employed for treatment of strand material with liquids or vapors, either cold or hot, and in particular heated vapors under pressure. For example, there are many different types of drying chambers through which the strand is passed while following a complex course and into which heated air or other gas is introduced at the same time. When it is desired to condition the strands, they may be subjected to steam in a similar apparatus. In all such apparatus, where the fluid medium is under high pressure, damage to the strand at the ports of entry and exit often results because of irregular escape of the fluid media therefrom, which causes abrasion of the strand.

"For example, it is the practice to treat synthetic or artificial strands with steam for the purpose of facilitating the stretching of the strands or to cause the strands to shrink. Conventional apparatus employed for this purpose comprises an inclosure containing an atmosphere of steam into which the strands are introduced and then withdrawn through suitable openings in the inclosure. The openings through which the strand passes are made as possible to minimize the escape of steam, but because of their small size are likely to subject the strand to abrasion. There is a pressure drop across the openings and the escaping steam exerts a frictional effect on the strand passing through the openings, which sets up a tension in the strand in addition to the tension exerted by any mechanical stretching devices. The tension due to this pressure drop adversely affects the strand, often resulting in chafing or breaking thereof, especially at the entrance opening when the flow of steam from the inclosure is countercurrent to the direction of travel of the strand . . . ."

Other prior art includes U.S. Patent No. 2,932,183, dated April 12, 1960. The invention itself is concerned primarily with a pressurized sealing device for eliminating leakage from a pressurized chamber in the interior of which a heat-treating or annealing operation is carried out on a continuously moving tow of synthetic material, specifically a polyacrylonitrile filamentary material.

The advantages of an annealing treatment of a tow of polyacrylonitrile or other synthetic filamentary material are disclosed in, for example, the copending application of Mario Sonnino, Serial No. 25,782, filed April 29, 1960, and in the application of Yoshimasa Fujita, Takeshi Okazaki and Keijiro Kuratani, Serial No. 25,783, also filed April 29, 1960, now abandoned in favor of copending application Serial No. 50,440, filed August 18, 1960, as a continuation-in-part of said application Serial No. 25,783. These copending applications are assigned to the same assignee as that of the present invention.

In continuously heat-treating polyacrylonitrile and other thermoplastic filamentary materials under super-atmospheric pressure in the prior art apparatus to improve its useful properties, the temperatures required for the treatment are often so high as to cause softening of the material to the point where it becomes subject to handling damage during removal from the treating zone or vessel. This is particularly true with respect to polyacrylonitrile and other thermoplastic strands which are continuously heated in an atmosphere of saturated or dry steam and which, during the process, are continuously passed through seals, between or over rolls, and over guides that cause or result in tension, friction, abrasion, etc., being placed upon the strands. Under these conditions of tension, friction and the like, damage to the strands can and often does take place when they are in a softened condition as a result of the temperature or other action (e.g., solvent action) to which they have been exposed. Furthermore, if any substantial stretching of the strands in or during their removal from the pressure zone or vessel has taken place, a subsequent step may be required in order to re-shrink them. Such an additional step obviously adds to the cost of the process.

The present invention provides a novel and unobvious solution to the aforementioned problems. It allows the strands to be handled in a normal manner as they pass through seals and straightening devices without detrimental stretching that occurs when they are subjected to tension or abrasion at high temperatures. Since stretching is prevented, there is no need to re-shrink the strands after they have been continuously annealed. It also improves the operation of the outlet-sealing means for reasons that will be pointed out hereinafter.

The novel features of the invention are set forth in the appended claims. The invention itself, however, will be understood most readily from the following detailed description thereof when considered in connection with the accompanying drawing, which is illustrative of the invention, and in which:

The problems set forth hereinbefore with respect to apparatus and a method for treating continuously moving strands of elongated material with a hot fluid medium under superatmospheric pressure in a pressure vessel having inlet- and outlet-sealing means and a main body portion are obviated by practicing the present invention. The apparatus features of the invention include primarily means for cooling the aforementioned strands, specifically strands of a polyacrylonitrile material, before they are removed from the aforementioned pressure vessel.

The cooling means of the apparatus features of the invention comprise a first compartment within the aforementioned pressure vessel. This compartment, which is located near the strand-discharge end of the vessel, is adapted to hold a mass of liquid cooling fluid, specifically a cooling fluid comprising water, and to permit the overflow of excess cooling fluid from the compartment. The cooling means also includes a second compartment which is in operative relationship with the first compartment and having a substantial portion of it elevated above the said first compartment and outside the main body portion of the aforementioned pressure vessel. This second compartment is likewise adapted to hold a mass of liquid cooling fluid, e.g., a cooling liquid comprising water.

The invention also provides means for introducing liquid cooling fluid into the aforementioned second compartment at a point outside the main body portion of the pressure vessel in which the strands are treated. Advantageously the point at which the liquid cooling fluid is introduced into the said second compartment is near the point of discharge of the continuously moving strands from the said second compartment. Means also are provided for removing from the aforementioned pressure vessel excess cooling fluid that overflows from the first compartment into the bottom of the pressure vessel, and means for guiding the continuously moving strands through the aforementioned first and second compartments and thence through the outlet-sealing means.

Advantageously the pressure vessel to which reference has been made hereinbefore is a cylindrical, horizontally-positioned, pressure vessel.

Figure 1:
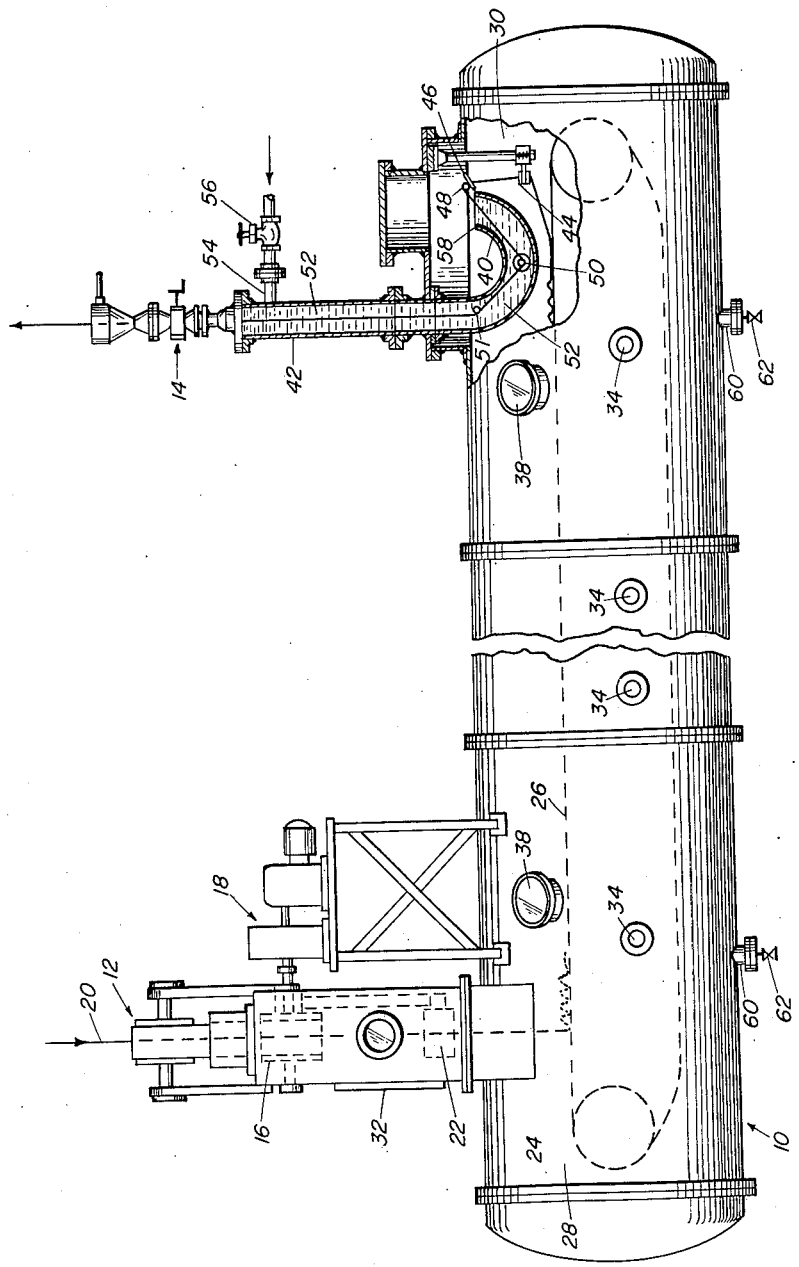
FIG. 1 is a side elevational view, partly broken away and partly in section of apparatus embodying the invention and showing specifically one form thereof.

In a preferred embodiment of the invention, which embodiment is shown in FIG. 1, the second compartment is an extension of the first compartment and is in the form of a standpipe extending up to the outlet-sealing means. In this embodiment the first compartment is located near the upper wall of the pressure vessel and near the strand-discharge end thereof. In another embodiment of the invention (see FIG. 2) the first compartment is located near the bottom wall of the pressure vessel. However, as in FIG. 1, the second compartment is an extension of the first compartment and is in the form of a standpipe extending up to the outlet-sealing means. In still another embodiment of the invention the first compartment is located near the bottom wall of the pressure vessel and near the strand-discharge end thereof, the second compartment is located outside of the said pressure vessel, and the outlet-sealing means is located intermediate the said first and second compartments.

The apparatus for treating continuously moving strands of elongated material with a hot fluid medium under superatmospheric pressure with which this invention is particularly concerned comprises, in combination, a pressure vessel having inlet- and outlet-sealing means and a main body portion; and a conveyor, advantageously an endless conveyor, within said pressure vessel that is adapted to support the strands and to carry them through the vessel, from one end to the other, while they are in a relaxed state. Other elements include rolls for drawing the tow into the vessel, plaiting rolls for laying the strands upon the conveyor and the other elements that have been mentioned hereinbefore.

Referring to the accompanying drawing and, more particularly, to FIG. 1 thereof, there is shown by way of illustration a pressure vessel 10 having tow inlet-sealing means 12 and tow outlet-sealing means 14. Such inlet- and outlet-sealing means are not a part of the present invention and, for the purpose of the instant invention, may be any of those known in the prior art including those disclosed in the aforementioned Patents 2,708,843 and 2,920,934. From the feed-in rolls 16 driven by driving means 18 a tow 20 of polyacrylonitrile filamentary material from a supply source (not shown but which is usually a prior step in the process) passes to the plaiting rolls or plaiter 22 and thence into the main body portion 24 of the vessel 10. By means of the plaiting rolls 22 the tow is laid transversely upon the endless conveyor 26 which carries the tow from the strand-inlet end 28 to the strand-outlet end 30 of the pressure vessel 10. Inspection door 32 with quick-opening latches provides ready access to this portion of the treating unit if desired or required.

In the pressure vessel 10 the tow is treated, while it is being conveyed in a relaxed state on the endless conveyor or belt 26, with a hot fluid medium comprising saturated steam at a temperature within the range of from about 105° C. to about 155° C., preferably within the range of from about 115° C. to about 140° C. Saturated steam under a pressure sufficient to provide the aforementioned temperature is introduced into the pressure vessel 10 through steam inlet 34. Sight glasses 38 permit inspection of the interior of the pressure vessel during operation.

When the tow approaches the end of the conveyor 26 it is removed therefrom and conducted to the first compartment 40 and thence to the second compartment 42, which is an extension of the first compartment. The tow is conducted through the first and second compartments with the aid of the guide means 44, 46, 48, 50 and 51. Both the first and second compartments are filled with a liquid cooling fluid 52. This cooling fluid is introduced into the second compartment 42 at a point outside the main body portion 24 of the pressure vessel 10 and near the point of discharge of the continuously moving strands from the second compartment 42, by means of the conduit 54 provided with the valve 56.

In operation excess liquid cooling fluid 52 overflows from the overflow end 58 of the first compartment 40 into the bottom of the vessel 10 where it commingles with condensate resulting from the condensation of the steam that is introduced through the steam inlets 34, and is withdrawn through the conduits 60 provided with the valves 62.

Figure 2:
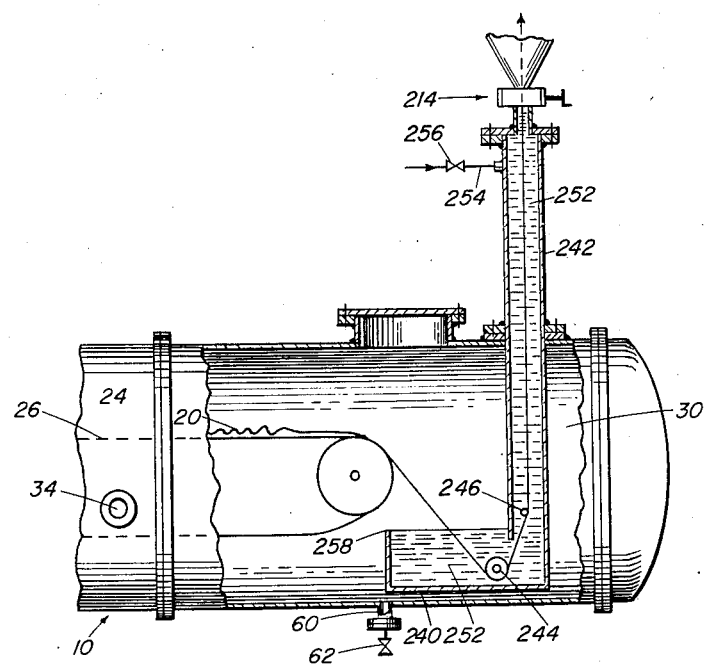
FIG. 2 is also a side elevational view, partly broken away and partly in section of apparatus embodying the invention and showing specifically another form thereof.
Figure 3:
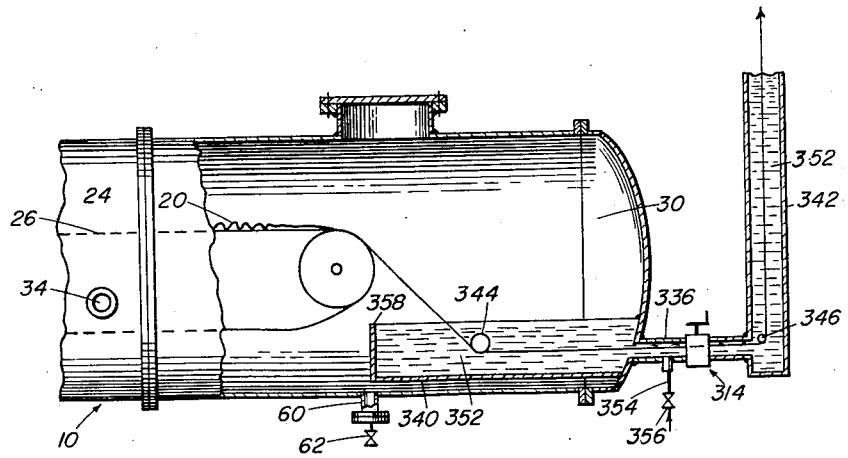
FIG. 3 is also a side elevational view, partly broken away and partly in section of apparatus embodying the invention and showing specifically still another form thereof.

FIGS. 2 and 3 illustrate other modifications of the present invention. In these figures corresponding numbers have been employed to designate the elements corresponding to those shown in FIG. 1. Those elements of FIGURES 2 and 3 which are structurally and functionally identical with the corresponring elements of FIGURE 1 are given identical numbers, whereas, those elements which are structurally different but functionally similar are given numbers 200 higher for FIGURE 2 and 300 higher for FIGURE 3. Hence no detailed description of the arrangements shown in FIGS. 2 and 3 or of the operation thereof is believed to be necessary.

A particular advantage of the arrangement shown in the illustrated embodiments of the invention resides in the fact that the water which quenches the strands is adjacent to the seal, whereby the seal is cooled and water leakage is substituted for steam or other gaseous leakage in the operation of the apparatus. The standpipe in FIGS. 1 and 2 extending up to the outlet seal gives increased contact time and places the cold bath between the hot atmosphere of the vessel and the seal which is adjacent to the outside air. The practical advantages of this will be immediately apparent to those skilled in the art.

In lieu of or in addition to the sealing means 314 where the same is shown in FIG. 3, a sealing means may be provided at the exit end of second compartment 342 in the same manner as is shown in FIGS. 1 and 2. Liquid cooling fluid 352 then may be introduced into the compartment 342, at the same relative point as has been described with particular reference to FIG. 1, in place of or in addition to introducing said cooling fluid into the conduit 336 (FIG. 3) at a point between the sealing means 314 (not shown in FIG. 3) and the entrance to the first compartment 340.

In a typical operation of the apparatus of the present invention a tow of oriented, polyacrylonitrile filamentary material, specifically one made from a copolymer, more particularly a ternary polymer, of copolymerizable ingredients including, by weight, 85% acrylonitrile, 7.5% vinyl acetate and 7.5% 2-methyl-5-vinylpyridine, having a total denier of about 500,000 is introduced into the pressure vessel 10 in the manner described hereinbefore. The tow is plaited on the conveyor belt 26 and is passed through the pressure vessel 10 at a rate such that the time that any given point on this tow is within the said chamber is about 3 minutes or less. Saturated steam is introduced into the vessel 10 through the steam inlets 34 under a pressure such that the average temperature within the vessel is about 127° C. The water which is introduced into the second compartment 42, 242, or 342 is at ambient temperature, e.g., a temperature of about 30° C. This water sufficiently cools the tow leaving the end of the conveyor belt 26 so that the tow is not softened as it is drawn through the first and second compartments and thence through the outlet-sealing means by means of suitable drawing rolls (not shown). Hence the tow is not stretched and is not damaged as it passes out of the vessel 10 and through the outlet-sealing means 14, 214, or 314. (The tow leaving the outlet-sealing means is at a temperature below 50° C., e.g., from 35° to 45° C.) In marked contrast, without the described cooling apparatus the tow undergoes substantial tension, is stretched to a degree such that a degree such that a re-shrinking step is often necessary, and is severely abraded and otherwise damaged insofar as many of its useful properties are concerned.

The apparatus of the present invention can be provided with automatic temperature controls as well as with automatic controls for maintaining the level of the liquid coolant in first compartment 40, 240, or 340 where desired.

It will be understood, of course, by those skilled in the art that our invention is not limited to the processing of a tow of a polyacrylonitrile filamentary material of the kind described in the preceding paragraphs. Thus, instead of using such a tow of filamentary material we may use a tow of filamentary material comprised of a homopolymer of acrylonitrile or a copolymer of about 90% by weight of acrylonitrile and about 10% by weight of methyl acrylate. Other acrylonitrile copolymers (thermoplastic, fiber-formable copolymers) of which the tow may be composed or comprised are acrylonitrile copolymers containing in the polymer molecules an average of, for example, at least about 35%, preferably at least about 70%, by weight of combined acrylonitrile. Taking as an example the expression "an acrylonitrile polymer containing in the polymer molecules an average of at least about 35% by weight of combined acrylonitrile," this means herein a polymerization product (homopolymer, copolymer or graft polymer or mixtures thereof) containing in the molecules thereof an average of at least about 35% by weight of the acrylonitrile unit, which is considered to be present in the individual polymer molecule as the group

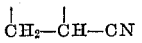

or, otherwise stated, at least about 35% by weight of the reactant substance converted into and forming the polymerization product is acrylonitrile. The expression "an acrylonitrile polymer containing in the polymer molecules an average of at least 70% by weight of combined acrylonitrile" has a similar meaning herein.

Illustrative examples of monomers which may be copolymerized with acrylonitrile to yield a polymerization product containing in the polymer molecules an average of at least 35%, preferably at least about 70%, by weight of combined acrylonitrile are compounds containing a single $CH_2=C<$ grouping, for instance, the vinyl esters and especially the vinyl esters of saturated aliphatic monocarboxylic acids, e.g., vinyl acetate, vinyl propionate, vinyl butyrate, etc.; vinyl halides, e.g., the vinyl chlorides, bromides and fluorides; allyl-type alcohols, e.g., ally alcohol, methallyl alcohol, ethallyl alcohol, etc.; allyl, methallyl and other unsaturated monohydric alcohol esters of monobasic acids, e.g., allyl and methallyl acetates, laurates, cyanides, etc.; acrylic and alkacrylic acids (e.g., methacrylic, ethacrylic, etc.) and esters and amides of such acids (e.g., methyl, ethyl, propyl, butyl, etc., acrylates and methacrylates; acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e.g., isobutylene, etc.; and numerous other vinyl, acrylic and other compounds containing a single $CH_2=C<$ grouping which are copolymerizable with acrylonitrile to yield thermoplastic, fiber-formable copolymers. Alkyl esters of alpha,beta-unsaturated polycarboxylic acids also may be copolymerized with acrylonitrile to form copolymers, e.g., the dimethyl, -ethyl, -propyl, -butyl, etc., esters of maleic, fumaric, citraconic, etc., acids.

Ordinarily, the molecular weight (average molecular weight) of the polyacrylonitriles (homopolymeric or copolymeric acrylonitriles) used in making the tow of filaments is within the range of 25,000 or 30,000 to 200,000 or 300,000 or higher, and advantageously is of the order of 50,000 to 100,000, e.g., about 65,000 to 75,000, as calculated from a viscosity measurement of the said polymerization product in dimethylformamide using the Staudinger equation (reference: U.S. Patent No. 2,404,713).

The tow of polyacrylonitrile filamentary material may be produced from an acrylonitrile polymerization product by any suitable method and using any suitable apparatus, but advantageously is produced as is described in, for instance, Sonnino Patent No. 2,849,751, dated September 2, 1958.

The present invention is applicable to the treatment of various kinds of strands, among which may be mentioned strands of cotton, wool, flax, hemp, silk and other natural filamentary materials, and the various synthetic filamentary materials including regenerated cellulose such as the various rayons (including cuprammonium cellulose), cellulose ethers and esters, among which may be specifically mentioned ethyl cellulose, hydroxyethyl cellulose, etc., cellulose acetate, cellulose nitrate, cellulose butyrate, cellulose acetate butyrate, cellulose propionate butyrate, the various mixed cellulose esters and ethers, and the various vinyl resins including the various polyacrylonitriles of which numerous examples hereinbefore have been given. Additional examples of synehetic filamentary materials to which the present invention is applicable include those strands made from polyethylene, polypropylene and other polyolefins, the various polyvinyl halides including polyvinyl chloride, polyvinyl fluoride, etc., copolymers of vinyl chloride with, for example, vinyl acetate or acrylonitrile, after-chlorinated polymers, e.g., after-chlorinated vinyl and vinylidene homopolymers and copolymers, also homopolymeric and copolymeric vinylidene halides including the chlorides and fluorides, and the various condensation polymers including the various polyesters, polyamides, polyanhydrides, etc.

The principles of the present invention also can be used in those cases where it may be desirable or advantageous to hot-stretch a strand of elongated material at an elevated temperature under superatmospheric pressure and then to cool the material before it is exposed to atmospheric temperature and pressure. In such cases the conveyor belt would be eliminated and the strand would be stretched between a series of draw rolls in which the latter rolls of the series would be driven at a higher peripheral speed than the ones preceding it, thereby imparting stretch to the tow.

The principles of the present invention also can be used to provide a liquid seal between the inlet seal 12 and the interior of the vessel 10 so as to effectively separate the superatmospheric gases, e.g., steam contained in the vessel, from the seal 12, thus preventing the escape of such gases through the inlet seal in a direction countercurrent to the fibers moving through the seal into the vessel. By use of this principle and device at the entance, installed between the seal 12 and the interior of the vessel 10, lubrication is provided for the tow or fibers passing through the inlet seal, and fusion of the fibers is prevented by maintaining the fibers at a sufficiently low temperature during the passage through the restriction of the inlet seal. In other words, elements such as are set forth in the appended apparatus claims, and shown by way of illustration in FIGS. 1, 2 and 3 of the accompanying drawing, as being present at the strand-outlet end 30 of the vessel 10 also can be used advantageously, if desired, at the strand-inlet end 28 of the said vessel.

This application is a division of our copending application Serial No. 38,326, filed June 23, 1960.

We claim:

1. In apparatus for treating continuously moving strands of elongated material with a hot fluid medium under superatmospheric pressure in a pressure vessel having inlet- and outlet-sealing means and a main body portion, the improvement which includes means for cooling said strands before being continuously removed from said vessel, said means comprising a first compartment within the said pressure vessel and located near the strand-discharge end thereof, said first compartment being adapted to hold a mass of liquid cooling fluid and to permit the overflow of excess cooling fluid therefrom; a second compartment in operative relationship with the said first compartment and having a substantial portion of it elevated above the said first compartment and outside the main body portion of the said pressure vessel, said second compartment likewise being adapted to hold a mass of cooling fluid; means for introducing liquid cooling fluid into the said second compartment at a point outside the main body portion of the said pressure vessel; means for removing from the said pressure vessel excess fluid that overflows from said first compartment into the bottom of the said pressure vessel; and means for guiding the said continuously moving strands through the said first and second compartments and thence through the said outlet-sealing means.

2. Apparatus as in claim 1 wherein the means for introducing liquid cooling fluid into the second compartment is at a point outside the main body portion of pressure vessel and near the point of discharge of the continuously moving strands from the said second compartment.

3. Apparatus as in claim 1 wherein the second compartment is an extension of the first compartment and is in the form of a standpipe extending up to the outlet-sealing means.

4. Apparatus as in claim 1 wherein the pressure vessel is a cylindrical, horizontally-positioned, pressure vessel, the first compartment is located near the upper wall of the said vessel and near the strand-discharge end thereof, while the second compartment is an extension of the first compartment and is in the form of a standpipe extending up to the outlet-sealing means.

5. Apparatus as in claim 1 wherein the pressure vessel is a cylindrical, horizontally-positioned, pressure vessel, the first compartment is located near the bottom wall of the said vessel and near the strand-discharge end thereof, while the second compartment is an extension of the first compartment and is in the form of a standpipe extending up to the outlet-sealing means.

6. Apparatus as in claim 1 wherein the pressure vessel is a cylindrical, horizontally-positioned pressure vessel, the first compartment is located near the bottom wall of the said vessel and near the strand-discharge end thereof, the second compartment is located outside of the said pressure vessel, and the outlet-sealing means is located intermediate the said first and second compartments.

7. Apparatus for treating continuously moving strands of elongated material with a hot fluid medium under superatmospheric pressure comprising, in combination, a pressure vessel having inlet- and outlet-sealing means and a main body portion; a conveyor within said vessel that is adapted to support the strands and to carry them through the vessel while they are in a relaxed state; a first compartment within the said pressure vessel that is located near the strand-discharge end of the said conveyor, said first compartment being adapted to hold a mass of liquid cooling fluid and to permit the overflow of excess cooling fluid therefrom; a second compartment in operative relationship with the said first compartment and having a substantial portion of it elevated above the said first compartment and outside the main body portion of the said pressure vessel, said second compartment likewise being adapted to hold a mass of liquid cooling fluid; means for introducing liquid cooling fluid into the second compartment at a point outside the main body portion of the said pressure vessel and near the point of discharge of the continuously moving strands from the said second compartment; means for removing from the said pressure vessel excess fluid that overflows from the said first compartment into the bottom of the said pressure vessel; and means for guiding the said continuously moving strands through the said first and second compartments and thence through the said outlet-sealing means.

8. Apparatus as in claim 1 wherein the pressure vessel is a cylindrical, horizontally-positioned pressure vessel.

References Cited in the file of this patent

UNITED STATES PATENTS

| | | |
|---|---|---|
| 761,107 | Rovira | May 31, 1904 |
| 2,029,985 | Clark | Feb. 4, 1936 |
| 2,831,332 | Ross | Apr. 22, 1958 |